June 13, 1961   K. H. HANSEN   2,988,162
MOTOR VEHICLE

Filed Oct. 1, 1959   4 Sheets-Sheet 1

INVENTOR.
Kai H. Hansen
BY
L. D. Burch
ATTORNEY

INVENTOR.
Kai H. Hansen
BY
L. D. Burch
ATTORNEY

United States Patent Office 2,988,162
Patented June 13, 1961

2,988,162
MOTOR VEHICLE
Kai H. Hansen, Detroit, Mich., assignor to General Motors Corporation, Detroit, Mich., a corporation of Delaware
Filed Oct. 1, 1959, Ser. No. 843,717
3 Claims. (Cl. 180—73)

This invention relates to motor vehicles, particularly to motor vehicles in which a separately assembled and removable traction unit may be employed.

It is proposed to provide a motor vehicle embodying a traction unit including a power train that may employ an internal combustion engine and a transmission, the two being secured together by a differential employed in driving a pair of the ground wheels of the vehicle. The power train may, if desired, be removably suspended beneath the vehicle. It is further proposed to provide a vehicle traction unit including a cross member having suspension means at the ends thereof for supporting the ground wheels employed in driving the vehicle. Then, it is proposed to provide a vehicle body having longitudinally spaced frame members. It is proposed to secure the body to the cross member at one of the longitudinally spaced frame members and to secure the power train to the cross frame and the other of the longitudinally spaced frame members of the body. Suitable suspension means is employed in supporting the cross member upon the ground wheels driving the vehicle and suitable axle means is employed in driving the ground wheels from the differential. Also, suitable resilient or other mounting means is employed in removably securing the cross member to one of the longitudinally spaced frame members, one end of the power train to the cross member and the other end of the power train to the other of the longitudinally spaced frame members.

In the drawings:

FIGURE 3 is taken in the plane of line 3—3 on FIGURE 2 looking in the direction of the arrows.

Figure 1:
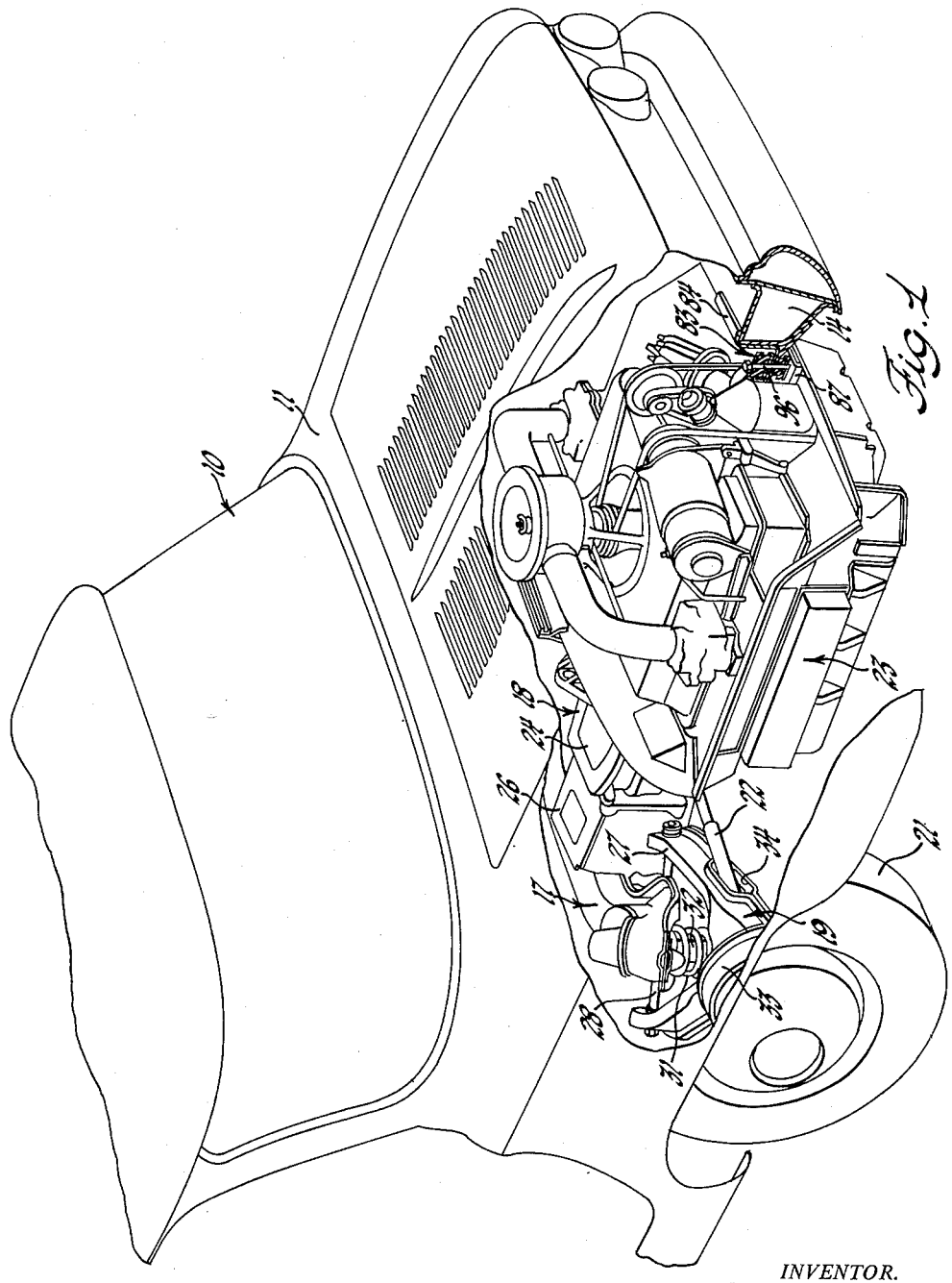
FIGURE 1 is a fragmentary perspective view of a motor vehicle embodying the invention.
Figure 2:
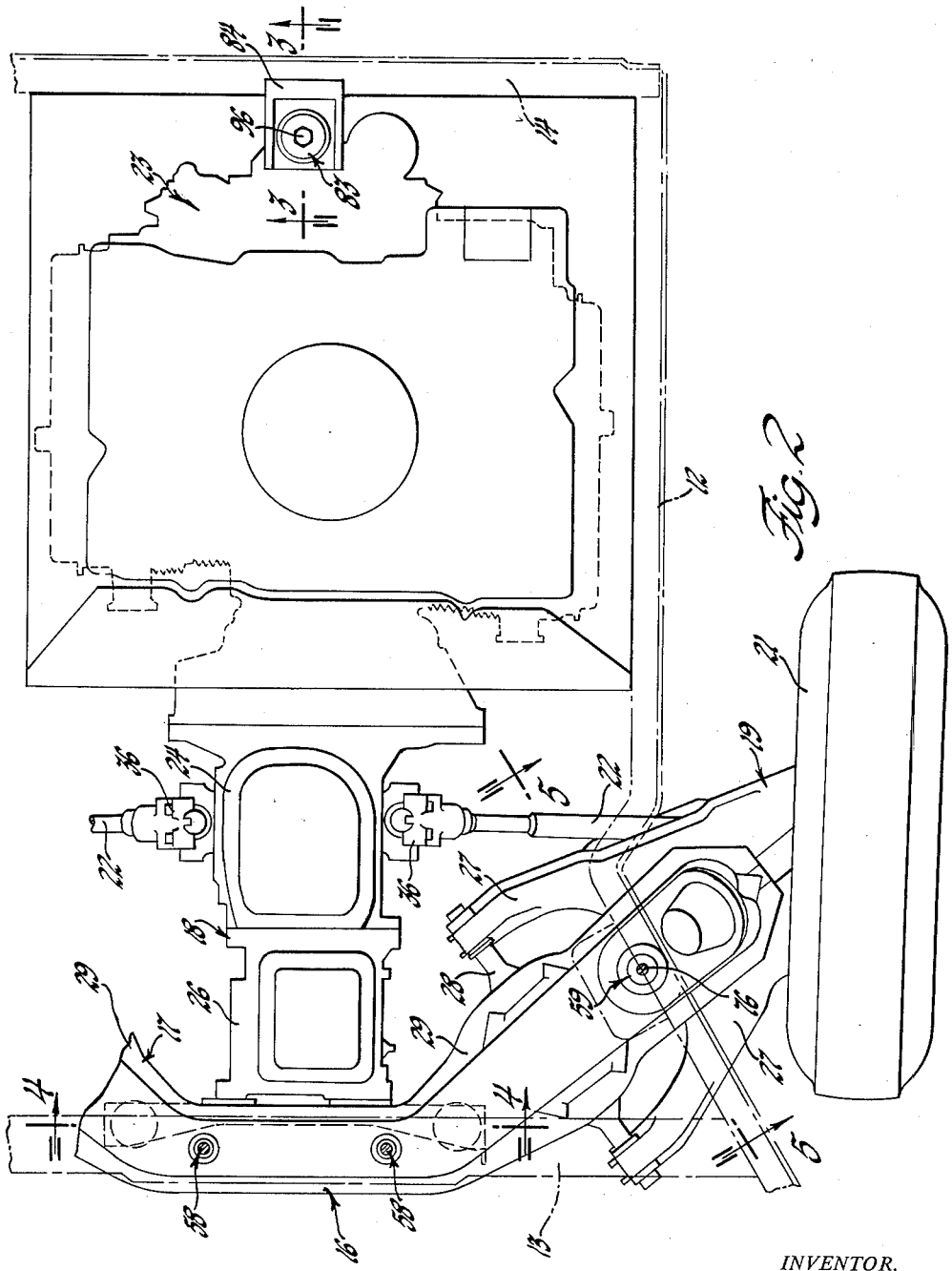
FIGURE 2 is a fragmentary plan view of a traction unit embodied in the motor vehicle illustrated by FIGURE 1.
Figure 3:
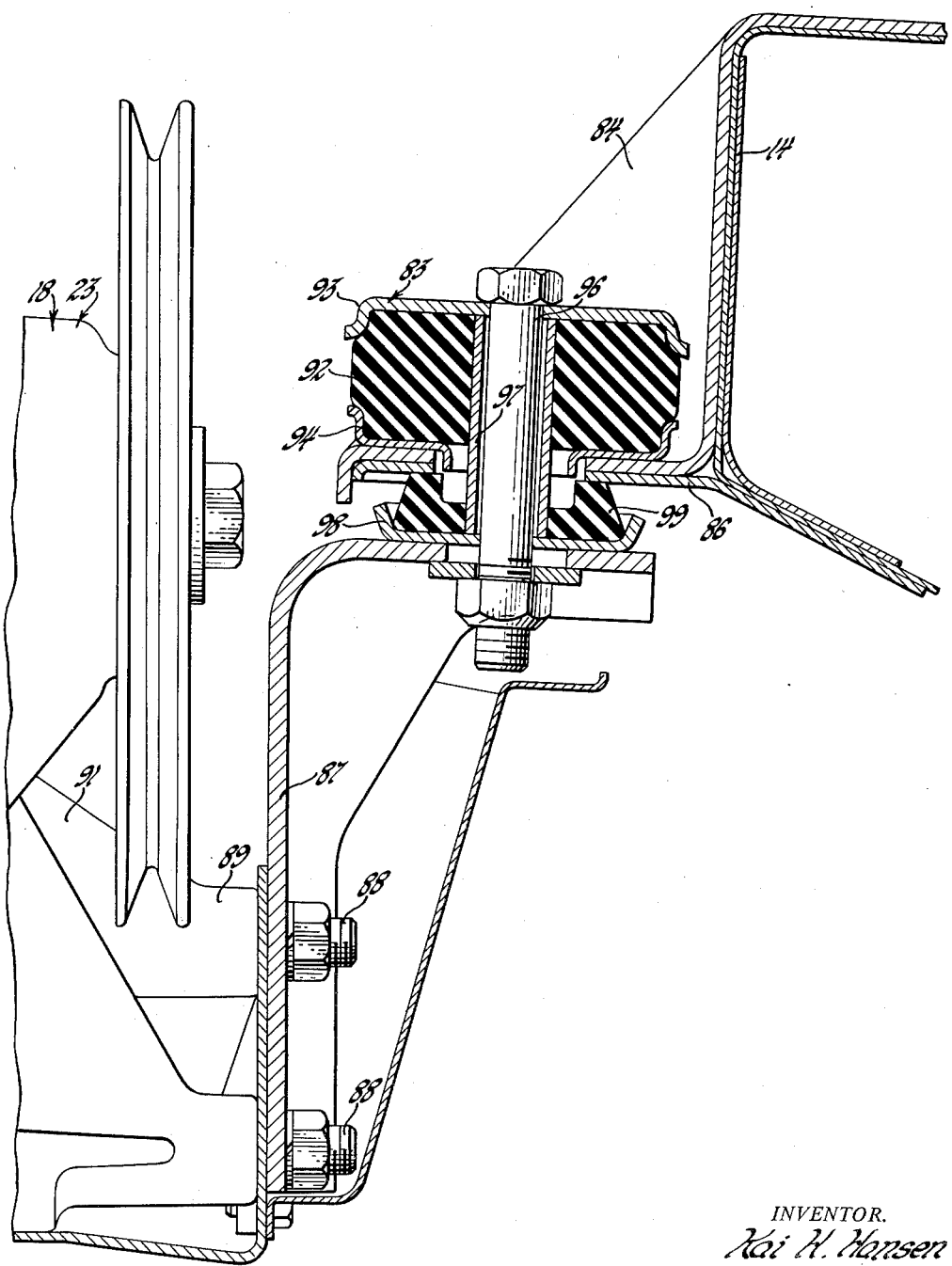
FIGURE 3 is a fragmentary sectional view of one of the traction unit mountings employed in the motor vehicle and traction unit disclosed by FIGURES 1 and 2.
Figure 4:
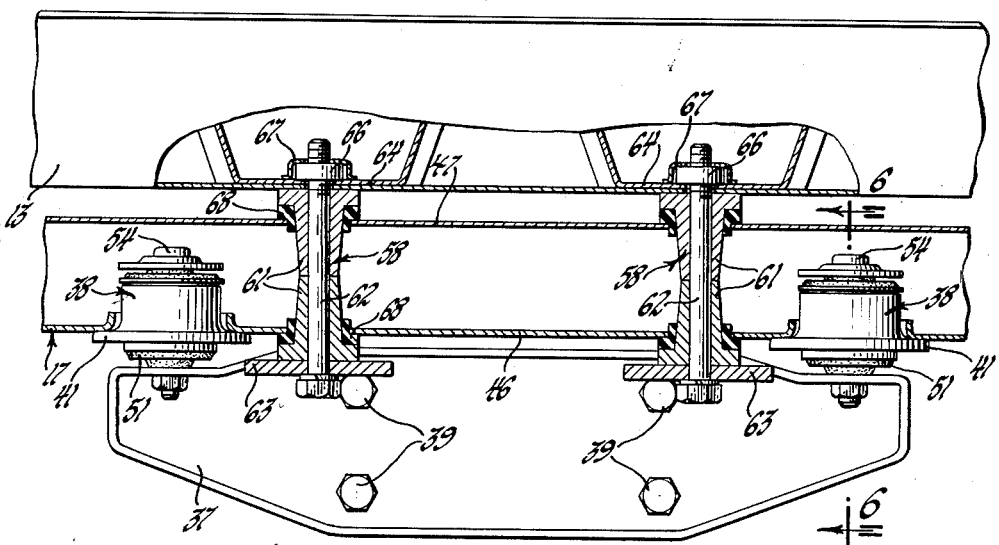

FIGURE 4 is a fragmentary vertical sectional view through the body of the vehicle disclosed by FIGURE 1 and through the cross member part of the traction unit disclosed by FIGURE 2. FIGURE 4 particularly illustrates the front power train mountings and the front intermediate traction unit mountings in the vehicle and power train structure illustrated by FIGURES 1 and 2. FIGURE 4 is taken substantially in the plane of line 4—4 on FIGURE 2 looking in the direction of the arrows.

Figure 5:
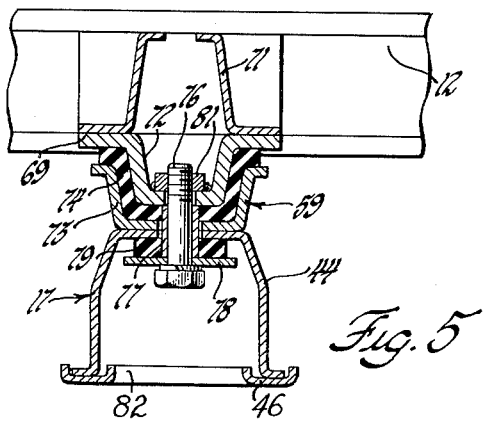

FIGURE 5 is a fragmentary vertical sectional view through one end of the cross member of the traction unit and through a vehicle body frame member at the side of the vehicle, and illustrating the mounting of the end of the frame member on the body member. FIGURE 5 is taken substantially in the plane of line 5—5 on FIGURE 2 looking in the direction of the arrows.

Figure 6:
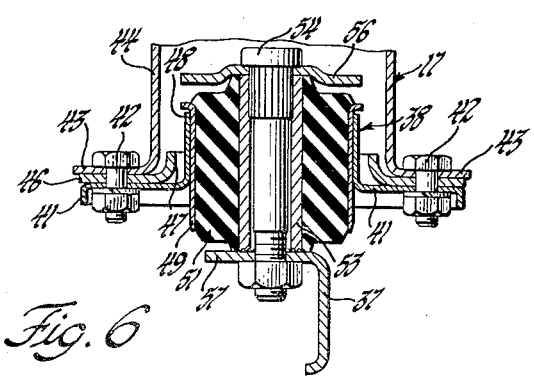

FIGURE 6 is a vertical sectional view through the cross member and one end of a bracket employed at the front of the power train of the traction unit and illustrating the mounting of the bracket on the cross member at one end of the bracket. FIGURE 6 is taken substantially in the plane of line 6—6 on FIGURE 4 looking in the direction of the arrows.

The vehicle 10 embodying the invention includes a vehicle body 11 having unitary or other suitable longitudinal frame members 12 at each side of the body and similar unitary or other suitable spaced frame members 13 and 14. In the present instance the vehicle 10 is powered and driven from the rear end of the body of the vehicle so that the frame member 14 may be disposed near the rear end of the body with the frame member 13 disposed in spaced relation to the latter and forwardly thereof. The rear end of the body 11 is adapted to be supported by a traction unit 16 disposed beneath the body and extending substantially from the frame member 13 to the frame member 14.

The traction unit 16 includes a cross member 17, a power train 18, wheel suspension means 19, ground wheels 21, and driving axle means 22. The power train 18 includes an opposed cylinder air cooled internal combustion or other suitable engine 23, a differential or other suitable driving means 24 and a transmission or other suitable driving means 26. The engine 23, differential 24 and transmission 26 are preferably bolted or otherwise secured together to provide a rigid beam embracing the power train 18. The suspension means 19 supporting the ground wheels 21 at each side of the vehicle 10 may include a control arm 27 pivotally mounted on shafts 28 extending across and secured to the obliquely disposed ends 29 of the cross member 17. The outer ends of the cross member 17 are adapted to extend over the outer ends of the control arm 27 where they are supported on the control arm 27 by spring means 31. Shock absorber means 32 may be employed within the spring means 31 for snubbing the control arms 27 with respect to the cross member 17. The ground wheels 21 are rotatably mounted in bearings disposed between the spindles of the ground wheels and the outer ends of the control arms 27. Brakes 33 may be employed on the ground wheels 21. The ground wheels 21 are adapted to be driven by axles 22 which may project through openings 34 in the sides of the control arms 27. The differential 24 may be connected to the axles 22 by universal joints 36. The centers of rotation of the universal joints 36 are intersected by the axes of the shafts 28, the shafts 28 being disposed in front of the axles 22 and being so positioned that the axes of the control arms 27 will intersect beyond the universal joints 36 and on the engine side of the axles 22.

The beam structure embracing the power train 18 may be secured to the cross member 17 by a transverse bracket member 37 and resilient mountings 38. The bracket member may be bolted or otherwise secured at 39 to the front end of the transmission 26. The mountings 38 may include brackets 41 which may be bolted at 42 to the flanged edges 43 of the cross member 17. The cross member 17 may be formed in any suitable manner but in the present instance the cross member is a box section cross member consisting of an upper channel member 44 and a lower plate 46, the two members being welded together at the flanged edges 43. The lower plate member 46 may have flanged openings 47 receiving the upper parts of the mountings 38 within the cross member 17. The brackets 41 may have upwardly extending flanges 48 welded or otherwise secured to collar 49 in which the outer surface of rubber or other resilient members 51 may be bolted. The members 51 may be tubular in form and may have inner sleeves 53 also bolted or otherwise secured thereto. The sleeves 53 are adapted to be compressed by bolts 54 between upper washers 56 and flanged upper edges 57 of the bracket 37. It will be apparent that the mountings 38 are tensioned mountings suspending the bracket 37 and the front end of the power train 18 beneath the cross member 17. When it is desired to release the bracket 37 and the front end of the power train from the cross member 17 it is necessary only to release the bolts 42 thereby causing the mountings 38 to be removed with the power train from within the openings 47.

The rear end of the body 11 is adapted to be secured on the cross member 17 by compression mountings 58 and 59. The mountings 58 secure the middle part of the body frame member 13 to the cross member 17 and the mountings 59 secure the body side rails 12 adjacent the ends of the body frame member 13 to the ends of the cross member 17. The mountings 58 include oppositely disposed flanged sleeves 61 that are compressed by bolts 62 between washers 63 at the lower ends of the bolts 62 and truss elements 64 that are embodied in the body frame members 13. The nuts 66 of the bolts 62 are normally held in fasteners 67 so that the bolts 62 can be operated and removed from the lower ends of the mountings. Rubber or other suitable resilient cushions or grommets 68 are employed between the flanged ends of the sleeves 61 and the upper and lower parts 47 and 46 of the cross member 17. The mountings 59 are supported by brackets 69 which are welded or otherwise secured to the lower surfaces of the side rails 12 and to brackets 71 that are secured to the inner surfaces of the side rails 12. The brackets 69 have projections 72 which are adapted to be received within and supported by receptacles 73 which are welded or otherwise secured to the upper part 44 of the cross member 17 near the ends of the cross member 17. Resilient or other suitable grommets or cushions 74 are employed between the brackets 69 and the receptacles 73. The brackets 69 are secured in the receptacles 73 and to the cross member 17 by bolts 76 which extend through sleeves 77 that are compressed by the bolts 76 between the brackets 69 and washers 78 within the cross member 17 and inwardly of the part 44 of the cross member 17. Resilient grommets or cushions 79 are employed between the washers 78 and the inner surface of the upper part 44 of the cross member 17. The nuts 81 for the bolts 76 may be welded or otherwise secured to the brackets 69 so that the bolts 76 may be removed to release the mountings and the ends of the cross member 17 by manipulating the bolts through openings 82 in the lower parts 46 of the cross members 17.

The rear end of the power train 18 may be secured to the body cross member 14 by resilient tension mountings 83. The mountings 83 may be supported by a bracket 84 which is welded or otherwise secured to the inner and upper walls of the frame member 14. The lower part of the bracket 84 may be reinforced by a support 86 secured to the lower part of the bracket and to the lower wall of the body frame member 14. The rear end of the power train 18 has a bracket 87 which may be removably secured to the adjacent end of the engine 23 by bolts 88. The bolts 88 extend from bosses 89 projecting rearwardly from a rear end housing 91 forming a part of the frame of the engine 23. The mounting 83 includes a rubber grommet or cushion 92 that is secured between the receptacles 93 and 94 by a bolt 96. The bolt 96 projects through an inner sleeve 97 that is adapted to be compressed by the bolt 96 between the upper receptacle 93 and a support 98 that rests upon the bracket 87. The bolt 96 secures the upper receptacle 93 and the sleeve 97 and the bracket 98 rigidly to the bracket 87. A grommet or cushion 99 is disposed between the support 98 and the lower surface of the support 86. The mounting 83 suspends the rear end of the power train 18 beneath the bracket 84 with the bolt 96 being a tension member and the cushions 92 and 99 being under compression.

When it is desired to remove the entire traction unit 16 from the body 11, it is necessary only to release the bolts 62 and 76 at the front of the unit and the bolt 96 at the rear of the unit. The rear end of the body 11 then may be lifted by a hoist or other suitable means and the entire power train may be moved outwardly from beneath the body 11 by supporting the bracket 87 on any suitable truck and by rolling the unit on the ground wheels 21.

If it is desired to remove only the power train 18 from the vehicle 10 then it is necessary only to release the bolts 54 at the front and the bolt 96 at the rear, to disconnect the universal joints 36 and the various controls that may extend between the body and the power train. Then the power train may be removed from beneath the vehicle 10 in any suitable manner. It will be noted that under such circumstances the vehicle will still be supported on the ground wheels 21 and the cross member 17.

I claim:

1. A motor vehicle comprising a body having longitudinally spaced frame members, a cross member secured to one of said longitudinally spaced frame members, an elongated power train having engine means at one end and transmission means at the other end and differential means between said engine means and said transmission means, said power train being secured to said cross member at the tranmission end of said power train and being secured to the other of said longitudinally spaced frame members at the engine means end of said power train, wheel suspension means pivotally mounted on axes on the ends of said cross member at the sides of said vehicle, ground wheels supported by said suspension means, axle means extending laterally from said power train and universally connected to said differential means by universal joints and rigidly connected to said ground wheels, and means removably securing said cross member and said engine means end of said power train to said longitudinally spaced frame members, said pivotal mounting of said suspension means and said universal connection of said axle means being aligned on opposite sides of said vehicle, said wheel suspension means axes respectively intersecting the adjacent of said axle universal joints.

2. A motor vehicle comprising a body having longitudinally spaced frame members, a cross member adapted to be secured to one of said longitudinally spaced frame members, an elongated power train having engine means at one end and transmission means at the other end and differential means between said engine means and said transmission means, said power train being secured to said cross member at the transmission end of said power train and being adapted to be secured to the other of said longitudinally spaced frame members at the engine means end of said power train, wheel suspension means pivotally mounted on the ends of said cross member at the sides of said vehicle, ground wheels supported by said suspension means, axle means extending laterally from said power train and universally connected to said differential means and rigidly connected to said ground wheels, and means removably securing said cross member and said engine means end of said power train to said longitudinally spaced frame members, said pivotal mounting of said suspension means and said universal connection of said axle means being aligned on opposite sides of said vehicle, said pivotal mounting of said suspension means being on the transmission means side of said axle means with the axes of said mountings intersecting beyond said universal connection of said axle means to said differential means and on the engine means side of said axle means.

3. A motor vehicle comprising a body having longitudinally spaced frame members, a cross member secured to one of said longitudinally spaced frame members, a power train including engine means and axle drive means and secured to said cross member and to the other of said longitudinally spaced frame members, wheel suspension means pivotally mounted on the ends of said cross member at the sides of said vehicle on intersecting axes, ground wheels supported by said suspension means, axle means extending laterally from said power train and connected to said power train axle drive means through universal connection means and to said ground wheels, said body being supported on said cross member, said power train being suspended beneath said cross member and said other of said longitudinally spaced frame members, resilient compression means removably securing said cross member to said one of said longitudinally spaced frame members, and resilient tension means removably securing said power train to said cross member and to said other of said longitudinally spaced frame members, said wheel suspension means pivot axes each intersecting the adjacent of said universal connection means and intersecting each other beyond said universal connection means and on the engine means side of said axle means.

References Cited in the file of this patent

UNITED STATES PATENTS

| | | |
|---|---|---|
| 1,948,745 | Curtiss | Feb. 27, 1934 |
| 2,633,203 | Paton | Mar. 31, 1953 |
| 2,746,556 | Nallinger et al. | May 22, 1956 |
| 2,751,992 | Nallinger | June 26, 1956 |
| 2,777,728 | Barenyi | Jan. 15, 1957 |
| 2,814,352 | Muller | Nov. 26, 1957 |
| 2,837,348 | Muller | June 3, 1958 |
| 2,908,341 | Nallinger et al. | Oct. 13, 1959 |